April 24, 1962
L. S. HAMER
3,031,200
FLUID SEAL
Filed June 22, 1959
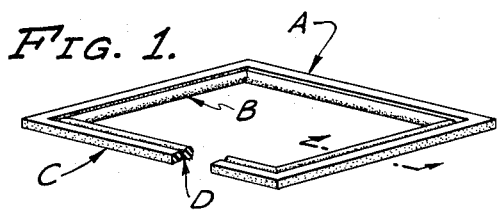
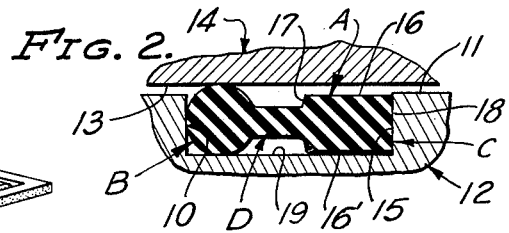
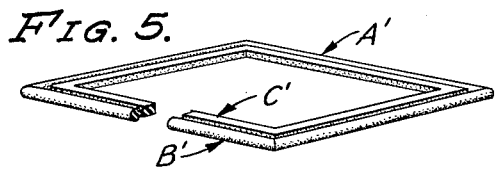
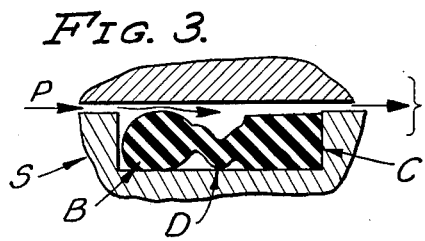
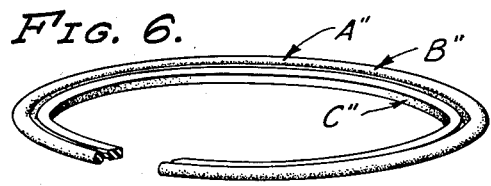
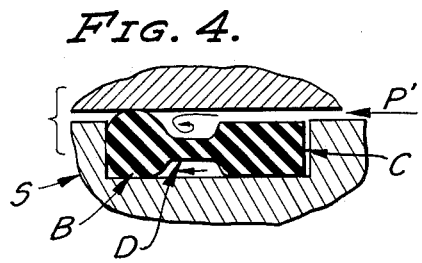
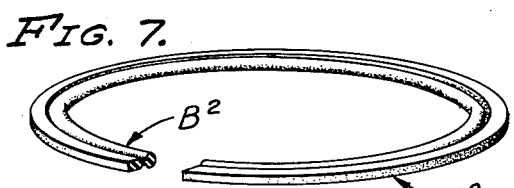
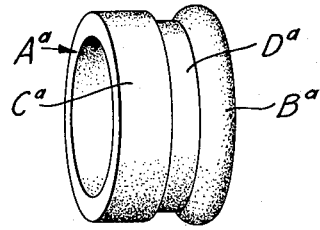
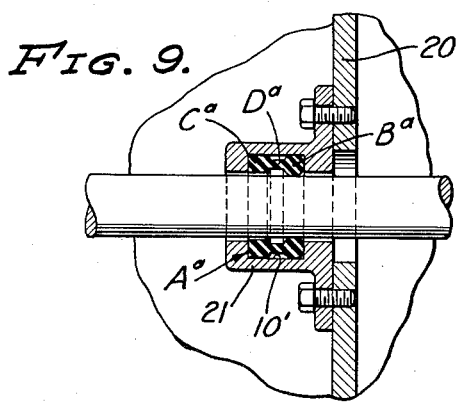
INVENTOR.
Leland S. Hamer
BY
AGENT United States Patent Office 3,031,200
Patented Apr. 24, 1962

3,031,200
FLUID SEAL
Leland S. Hamer, Long Beach, Calif., assignor to Chiksan Company, Brea, Calif., a corporation of California
Filed June 22, 1959, Ser. No. 822,158
3 Claims. (Cl. 277—177)

This invention relates to a novel seal construction and is more particularly concerned with an O-ring type seal adapted to seal in one direction only.

The ordinary or conventional O-ring seal is a simple, continuous, annular, polygonal body of resilient material, round in cross-sectional configuration and adapted to be engaged in an annular or polygonal groove entering a surface on one element or part and opposing a sealing surface on another element or part. The groove is of slightly less depth than the cross-sectional diameter of the ring so that the ring projects therefrom a predetermined extent and establishes pressure bearing and sealing engagement on the said opposing sealing surface of said other part. The groove in which the ordinary O-ring is engaged is substantially the same width as the cross-sectional diametric extent of the ring and has flat side walls normal to the plane of the opposing surfaces on the said parts, which walls serve to hold and/or back up the ring when fluid under pressure is exerted onto the ring from one side thereof or the other. The provision of a surface, such as the side walls of the groove, upon or against which the ring can seat and be held against lateral displacement, relative to the groove is essential to the satisfactory functioning of the O-ring seal.

The under-lying principles of operation of O-ring seals is well known in the art. The above, brief explanation of an ordinary or conventional O-ring type seal is intended to clarify the general type of sealing means concerned with in the present invention and should be sufficient for that purpose and for the ordinary person skilled in the art without further detailed explanation of this particular phase of the sealing art.

It is apparent and well recognized that the ordinary or conventional O-ring seal engaged in a groove in one of two opposing surfaces and sealing with the other surface, serves to seal and prevent the flow of fluid between the said surfaces in both directions past the ring. This is due to the fact that the ring finds support at both or either side of the groove.

Many situations have arisen where it would be desirable to employ an O-ring type seal, but such a seal which would seal in one direction only. Since the ordinary O-ring seals will not seal in one direction only, their use in such situations has been impossible and other, less effective, fluid pressure actuated, resilient sealing ring structures have been resorted to.

An object of the present invention is to provide a novel O-ring sealing ring structure which will seal in one direction only.

Another object of the invention is to provide an O-ring seal adapted to be engaged in a groove and having a laterally projecting part or portion at one side thereof which will prevent it from seating on the adjacent side of the groove and thereby establish a seal when urged by fluid pressure in one direction and against or towards the said adjacent side of the groove.

A further object of my invention is to provide an O-ring type seal of the character referred to that can be made in any desired plane configuration, a seal that is easy and economical to manufacture and a seal which is both highly effective and dependable in application.

The various objects and features of my invention will be fully understood from the following detailed description of typical preferred forms and applications of my invention, throughout which description reference is made to the accompanying drawings, in which:

FIG. 1 is a perspective view of one form of sealing ring construction as provided by the present invention.

FIG. 2 is an enlarged transverse sectional view of the ring illustrated in FIG. 1, taken as indicated by line 2—2 on FIG. 1 and showing it engaged in a groove in one part of a structure and engaging another part of the structure, preparatory to the application of fluid pressure thereon.

FIG. 3 is a view similar to FIG. 2 showing the manner in which the seal reacts when fluid is applied in one direction thereon.

FIG. 4 is a view similar to FIG. 3, showing the manner in which the seal acts when fluid pressure is applied in the other direction thereon.

FIGS. 5 through 8 show modified forms of the construction illustrated in FIGS. 1 through 4.

FIG. 9 is a sectional view of a structure with the form of the seal illustrated in FIG. 8 related thereto.

FIG. 10 is an enlarged cross-sectional view of still another form of my new seal.

The sealing ring provided by the present invention is in the nature of an O-ring seal and is adapted to seal and prevent the flow of fluid in one direction only.

In practice, the sealing ring can be polygonal as shown in FIGS. 1 and 5, or annular as shown in FIGS. 6 and 7, and adapted to prevent fluid under pressure from flowing either radially inwardly or radially outwardly, as circumstances require, or it can, as illustrated in FIGS. 8 and 9 of the drawings, be such as to prevent axial flow of fluid thereby in one direction or the other.

Considering first the form of the invention illustrated in FIGS. 1 through 4 of the drawings, the sealing ring A is a polygonal, substantially square, ring-like unit having an inner sealing portion B, an outer non-sealing carrier portion C and spaced circumferentially outwardly from the inner portion, and a central coupling portion D fixed to and extending between the inner and outer portions.

The inner sealing portion B is round in cross-sectional configuration and is, in effect, a simple O-ring seal. The outer non-sealing portion C is substantially rectangular in cross-section and is adapted to carry the inner portion B and is such that it will not provide adequate support or backing for the inner portion B when the said inner portion is urged into engagement therewith by fluid pressure. The central portion D is in the nature of a thin, flexible web formed integrally with and extending between the inner and outer portions B and C.

The ring A is molded of rubber or other suitable flexible resilient material.

In practice, and as illustrated in FIGS. 2, 3 and 4 of the drawings, the ring A is adapted to be engaged in a groove 10 entering a surface 11 on one part 12 of a fluid handling structure S and opposing a sealing surface 13 on another part 14 of the structure S. The structure S could be a form of valve construction, fluid container, pipe connection, hatch cover, or any other conceivable structure having opposing surfaces and which is subjected to fluid under pressure.

Since the particular structures to which the instant construction can be related can vary widely in form and construction, I have, in the drawings, shown fragments of what could be parts of any one of a number of fluid handling structures.

The groove 10 in the part 12 is of predetermined depth and width and has a flat bottom 19, parallel with the surfaces 11 and 13 and opposing the surface 13 and straight, parallel sides 15 normal to the bottom.

The inner portion B of the sealing ring A is larger in diametric extent than the depth of the groove 10 so that it projects from the groove a predetermined distance and is maintained in predetermined pressure engagement between the bottom 19 of the groove and the surface 13 on the part 14.

The outer portion C of the sealing ring A is of slightly less thickness than the depth of the groove 10 so that when the ring is engaged in the groove, the said portion C therefor is wholly within its confines of the groove.

The portion C has flat, parallel end walls 16 to oppose the bottom 19 of the groove and the surface 13 of the part 14, and parallel inner and outer side walls 17 and 18 normal to the end walls. The end wall 16 opposing the bottom 19 of the groove 10 is adapted to normally seat thereon and the outer side wall 18 is adapted to normally seat against the opposing side 15 of the groove.

The intermediate portion D is a thin, flexible web extending between the inner and outer portions B and C and, as illustrated, preferably connects with the portion C at the inner side wall 17 thereof and at a point midway between the ends 16 thereof and connect with the outermost side of the inner portion B. In other words, the web extends along the central plane of the ring.

In practice, the central web portion D could, if desired, be offset from the central plane of the ring and further, could, if desired, be perforated, as illustrated in the modified construction in FIG. 10 of the drawings.

The overall cross-sectional width of the ring A is slightly greater than the width of the groove so that it normally establishes sliding bearing engagement in the groove.

In operation, when fluid under pressure is urged between the parts 12 and 14 in the direction indicated by the arrow P in FIG. 3 of the drawings, the inner portion B of the ring is urged away from the adjacent side of the groove 10 and towards the outer portion C. When this takes place, the inner portion and the central portion are free to collapse.

Due to the resilient nature of the central portion D and the outer portion C, there is no structure provided to suitably back up and support the inner portion in a manner that will establish a seal between the ports 12 and 14.

When fluid under pressure is urged in the opposite direction between the parts 12 and 14, as indicated by the arrow P' in FIG. 4 of the drawings, it passes the outer portion C and engages and urges the inner portion B into engagement against the adjacent wall of the groove 10. When the inner portion B is urged towards the adjacent side of the groove 10, as set forth above, fluid under pressure is free to find its way around the outer portion C and act against the inner portion of the ring B, above and below the central web portion D.

In the last-mentioned situation, it will be apparent that the inner portion of the ring is in effect and functions as a simple O-ring seal.

In the form of the invention shown in FIG. 5 of the drawings, the relative positioning of the rectangular and round portions of the sealing ring A' is reversed, that is, the outer portion B' is round in cross-section and the inner portion C' is rectangular in cross-section. This construction operates or functions in the same manner as the first discussed form of the invention, except that the direction in which it seals is reversed.

The form of sealing ring A'' illustrated in FIG. 6 is similar to that shown in FIG. 5, that is, the round portion B'' is at the exterior of or about the rectangular portion C''. This form of seal differs from the forms shown in FIGS. 1 and 5 in that it is a round ring rather than polygonal.

The form of the invention shown in FIG. 7 is similar to that shown in FIG. 6 except that the portions $B^2$ and $C^2$ thereof are reversed. That is, the portion $B^2$ is arranged radially inwardly of the portion $C^2$.

In the form of the invention illustrated in FIGS. 8 and 9 of the drawings, the portions $B^a$ and $C^a$ of the sealing ring $A^a$ are annular and are arranged in longitudinally spaced axial alignment with each other and are connected with each other by the intermediate web portion $D^a$ which is in axial alignment with and extends therebetween.

The sealing ring $A^a$ is in the nature of a cylindrical sleeve and is adapted to seal against the flow of fluid about or along a shaft, or the like, in one direction only.

In FIG. 9 of the drawings I have shown the sealing ring $A^a$ engaging and sealing about a shaft extending through a bulk head 20 and carried in a radially inwardly opening groove 10' in an annular block 21 engaged about the shaft and secured to the bulk head.

It will be apparent that a sealing ring established in accordance with the ring shown in FIG. 8 of the drawings could be engaged in a radially outwardly opening groove in the shaft and could, whether engaged in a radially outwardly or radially inwardly opening groove be rotated end for end to control the direction in which it will seal.

Having described only typical preferred forms and applications of my invention, throughout which description reference is made to the accompanying drawings, I do not wish to be limited or restricted to the specific details herein set forth, but wish to reserve to myself any modifications or variations that may appear to those skilled in the art and fall within the scope of the following claims.

Having described my invention, I claim:

1. A sealing assembly comprising an annular groove of rectangular cross section in one of two opposed surfaces to be sealed against fluid pressure exerted therebetween in one direction only and a sealing ring disposed in said groove, said ring comprising an endless sealing member having a thickness greater than the depth of said groove, and an endless non-sealing member having a thickness not exceeding the depth of said groove, said sealing and non-sealing members being connected by a thin flexible web of reduced thickness and disposed at opposite sides of said groove, whereby fluid pressure exerted between said surfaces transversely of said groove in a direction toward the web connected side of said sealing member forces the sealing member against the adjacent groove wall and into deformed sealing relation with and between said surfaces, and fluid pressure exerted in the opposite direction toward the side of said sealing member adjacent said groove wall forces the sealing member away from said wall and toward said non-sealing member of less thickness to permit collapse of said ring and permit escape of said fluid pressure therepast between said surfaces.

2. A sealing assembly comprising an endless groove of rectangular cross section in one of two opposed surfaces to be sealed against fluid pressure exerted therebetween in one direction only, and a resilient sealing ring disposed in said groove, said ring comprising and endless sealing member of the O-ring type having a thickness greater than the depth of said groove, and an endless non-sealing member having a thickness not exceeding the depth of said groove, said sealing and non-sealing members being connected by a thin integral flexible web of reduced thickness and disposed at opposite sides of said groove, whereby fluid pressure exerted between said surfaces transversely of said groove in a direction toward the web connected side of said sealing member forces the sealing member against the adjacent groove wall and into deformed sealing relation with and between said surfaces, and fluid pressure exerted in the opposite direction toward the side of said sealing member adjacent said groove wall forces the sealing member away from said wall and toward said non-sealing member of less thickness to permit collapse of said ring and escape of said fluid pressure therepast between said surfaces.

3. A sealing assembly comprising an annular groove in one of two opposed surfaces to be sealed against fluid pressure exerted therebetween in one direction only, and a resilient sealing ring disposed in said groove, said ring comprising a sealing annulus of the O-ring type of substantially circular cross-section and having a thickness greater than the depth of said groove, and a non-sealing annulus of polygonal cross-section having a thickness not exceeding the depth of said groove, said sealing and non-sealing annuli being integrally connected by a thin annular flexible web of reduced thickness and disposed at opposite sides of said groove, whereby fluid pressure exerted between said surfaces transversely of said groove in a direction toward the web connected side of said sealing annulus forces the sealing annulus against the adjacent groove wall and into deformed sealing relation with and between said surfaces, and fluid pressure exerted in the opposite direction toward the side of said sealing annulus adjacent said groove wall forces the sealing annulus away from said wall and toward said non-sealing polygonal annulus of less thickness to permit collapse of said ring and escape of said fluid pressure therepast between said surfaces.

References Cited in the file of this patent

UNITED STATES PATENTS

| | | |
|---|---|---|
| Re. 24,332 | Svenson | June 18, 1957 |
| 332,667 | Lyons | Dec. 15, 1885 |
| 2,599,767 | Long | June 10, 1952 |
| 2,858,150 | Neher | Oct. 28, 1958 |